US011057181B2

(12) United States Patent
Hosseini et al.

(10) Patent No.: US 11,057,181 B2
(45) Date of Patent: *Jul. 6, 2021

(54) CONTROL OVERHEAD REDUCTION FOR LOW LATENCY COMMUNICATION SYSTEMS

(71) Applicant: QUALCOMM Incorporated, San Diego, CA (US)

(72) Inventors: Seyedkianoush Hosseini, San Diego, CA (US); Amir Farajidana, Sunnyvale, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,830

(22) Filed: Sep. 25, 2019

(65) Prior Publication Data

US 2020/0021416 A1 Jan. 16, 2020

Related U.S. Application Data

(63) Continuation of application No. 15/890,965, filed on Feb. 7, 2018, now Pat. No. 10,447,453.
(Continued)

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1812* (2013.01); *H04L 1/1861* (2013.01);
(Continued)

(58) Field of Classification Search
None
See application file for complete search history.

(56) References Cited

U.S. PATENT DOCUMENTS 10,447,453 B2 * 10/2019 Hosseini ............. H04W 72/042
2003/0207696 A1 11/2003 Willenegger et al.
(Continued)

FOREIGN PATENT DOCUMENTS

| CN | 104769877 A | 7/2015 |
| JP | 2019527999 A | 10/2019 |
| WO | 2016126653 A1 | 8/2016 |

OTHER PUBLICATIONS

International Search Report and Written Opinion—PCT/US2018/017423—ISA/EPO—dated Apr. 26, 2018.
(Continued)

*Primary Examiner* — Jutai Kao
(74) *Attorney, Agent, or Firm* — Arent Fox, LLP

(57) ABSTRACT

The present disclosure relates to reducing control overhead in a wireless communication system. For example, a network entity may determine to transmit data according to a codeword format based on at least one of a transmission time interval (TTI), or a traffic type of the data, or any combination thereof, and configure the data for transmission on a communication channel according to the codeword format. Further, for instance, a user equipment may receive a transmission from a network entity on a downlink communication channel according to a codeword format, and transmit at least one of an acknowledgement (ACK) or a negative acknowledgement (NACK) on an uplink communication channel in response to receiving the transmission from the network entity.

17 Claims, 5 Drawing Sheets

Related U.S. Application Data

(60) Provisional application No. 62/458,399, filed on Feb. 13, 2017.

(51) Int. Cl.
*H04L 27/26* (2006.01)
*H04L 1/18* (2006.01)

(52) U.S. Cl.
CPC .......... *H04L 1/1893* (2013.01); *H04L 1/1896* (2013.01); *H04L 5/0023* (2013.01); *H04L 27/26* (2013.01); *H04W 72/042* (2013.01); *H04L 1/1822* (2013.01); *H04L 5/001* (2013.01); *H04L 5/0082* (2013.01); *H04L 5/0091* (2013.01)

(56) References Cited

U.S. PATENT DOCUMENTS

| | | |
|---|---|---|
| 2010/0056079 A1 | 3/2010 | Onggosanusi et al. |
| 2010/0115358 A1* | 5/2010 | Kotecha ............... H04L 1/1812 714/748 |
| 2011/0167326 A1 | 7/2011 | Kuri et al. |
| 2012/0201282 A1* | 8/2012 | Li ........................ H04B 7/065 375/219 |
| 2012/0218882 A1 | 8/2012 | Ko et al. |
| 2012/0243511 A1 | 9/2012 | Lv et al. |
| 2013/0235819 A1 | 9/2013 | Zhang |
| 2016/0233999 A1 | 8/2016 | Chendamarai Kannan et al. |
| 2016/0278102 A1 | 9/2016 | Bontu et al. |
| 2018/0041858 A1 | 2/2018 | Sheng et al. |
| 2018/0048451 A1 | 2/2018 | Yin et al. |
| 2018/0076942 A1 | 3/2018 | Nory et al. |
| 2018/0145818 A1 | 5/2018 | Choi et al. |
| 2018/0234226 A1 | 8/2018 | Hosseini et al. |

OTHER PUBLICATIONS

ETRI: "Frame Structure for New Radio Interface," R1-166942, 3GPP TSG RAN WG1 Meeting #86, Gothenburg, Sweden, Aug. 22-26, 2016, URL: https://www.3gpp.org/ftp/tsg_ran/WG1_RL1/TSGR1_86/Docs/ , 3 Pages.

Huawei, et al., "Discussion on DL MIMO Transmission", 3GPP TSG RAN WG1 Meeting #86bis, 3GPP Draft; R1-1608819, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 10, 2016-Oct. 14, 2016, Oct. 9, 2016 (Oct. 9, 2016), 4 Pages, XP051148873, Retrieved from the Internet: URL: http://www.3gpp.org/ftp/Meetings_3GPP_SYNC/RAN1/Docs/ [retrieved on Oct. 9, 2016] Section 3.1; p. second Section 4; p. third; figure.

Motorola: "E-UTRA TTI Size and Number of TTIs," 3GPP TSG-RAN WG1#46 R1-062058, 3GPP, Aug. 23, 2006, pp. 1-8.

Qualcomm Incorporated: "Design Details of the Shortened PDSCH", 3GPP TSG RAN WG1 #88, 3GPP Draft; R1-1702566, Athens, Greece, (Feb. 7, 2017), pp. 1-5.

Samsung: "Discussion on Processing Time Reduction with 1 ms TTI," R1-1608997, 3GPP TSG RAN WG1 Meeting #86bis, Lisbon, Portugal, Oct. 10-14, 2016, URL: https://www.3gpp.org/ftp/tsg_ran/WG1_RL1/TSGR1_86b/Docs/ , 5 pages.

Samsung, et al., "WF on Number of Codewords for NR," R1-1701291, 3GPP TSG RAN WG1 Meeting NR Ad Hoc, Spokane, USA, Jan. 16-20, 2017, URL: https://www.3gpp.org/ftp/tsg_ran/WG1_RL1/TSGR1_AH/NR_AH_1701/Docs/ , 3 Pages.

Taiwan Search Report—TW107104455—TIPO—dated Jun. 15, 2020.

* cited by examiner

CONTROL OVERHEAD REDUCTION FOR LOW LATENCY COMMUNICATION SYSTEMS

CROSS-REFERENCE TO RELATED APPLICATION(S)

This application is a continuation of U.S. Non-Provisional application Ser. No. 15/890,965, entitled "CONTROL OVERHEAD REDUCTION FOR LOW LATENCY COMMUNICATION SYSTEMS," and filed on Feb. 7, 2018, which claims the benefit of U.S. Provisional Application Ser. No. 62/458,399, entitled "CONTROL OVERHEAD REDUCTION FOR LOW LATENCY COMMUNICATION SYSTEMS" and filed on Feb. 13, 2017, both of which are expressly incorporated by reference herein in its entirety.

BACKGROUND

Aspects of the present disclosure relate generally to wireless communication networks, and more particularly, to reducing control overhead in new radio wireless communication systems.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, control overhead may inhibit a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The method may include determining to transmit data according to a codeword format based on at least one of a transmission time interval (TTI), or a traffic type of the data, or any combination thereof. Further, the method may include configuring the data for transmission on a communication channel according to the codeword format. The method may include transmitting the data on the communication channel.

In another aspect, a network entity comprises a memory and at least one processor in communication with the memory. The at least one processor may be configured to determine to transmit data according to a codeword format based on at least one of a TTI, or a traffic type of the data, or any combination thereof. The at least one processor may further be configured to configure the data for transmission on a communication channel according to the codeword format and transmit the data on the communication channel.

In an additional aspect, an apparatus for wireless communications at a network entity may include means for determining to transmit data according to a codeword format based on at least one of a TTI, or a traffic type of the data, or any combination thereof The apparatus may further include means for configuring the data for transmission on a communication channel according to the codeword format and means for transmitting the data on the communication channel.

In yet another aspect, a computer-readable medium storing computer code executable by a processor for wireless communications at a network entity may include code for determining to transmit data according to a codeword format based on at least one of a TTI, or a traffic type of the data, or any combination thereof. The computer-readable medium may further include code for configuring the data for transmission on a communication channel according to the codeword format, and code for transmitting the data on the communication channel.

In an aspect, the present disclosure includes a method for wireless communications at a user equipment. The method may include receiving a transmission from a network entity on a downlink communication channel according to one of a first codeword format or a second codeword format, the first codeword format and the second codeword format dependent on at least one of a TTI, or a traffic type of the data, or any combination thereof. The method may further include transmitting at least one of an acknowledgement (ACK) or a negative acknowledgement (NACK) on an uplink communication channel in response to receiving the transmission from the network entity.

In another aspect, a user equipment (UE) comprises a memory and at least one processor in communication with the memory. The at least one processor may be configured to receive a transmission from a network entity on a downlink communication channel according to a codeword format, the codeword format dependent on at least one of a TTI, or a traffic type of the data, or any combination thereof. The at least one processor may further be configured to transmit at least one of an ACK or a NACK on an uplink communication channel in response to receiving the transmission from the network entity.

In an additional aspect, an apparatus for wireless communications at a user equipment may include means for receiving a transmission from a network entity on a downlink communication channel according to a codeword format, the codeword format dependent on at least one of a TTI, or a traffic type of the data, or any combination thereof. The apparatus may further include means for transmitting at least one of an ACK or a NACK on an uplink communication channel in response to receiving the transmission from the network entity.

In yet another aspect, a computer-readable medium storing computer code executable by a processor for wireless communications at a user equipment may include code for receiving a transmission from a network entity on a downlink communication channel according to a codeword format, the codeword format dependent on at least one of a TTI, or a traffic type of the data, or any combination thereof. The computer-readable medium may further include code for transmitting at least one of an ACK or a NACK on an uplink communication channel in response to receiving the transmission from the network entity.

Moreover, the present disclosure also includes an apparatus having components or configured to execute or means for executing the above-described methods, and a computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
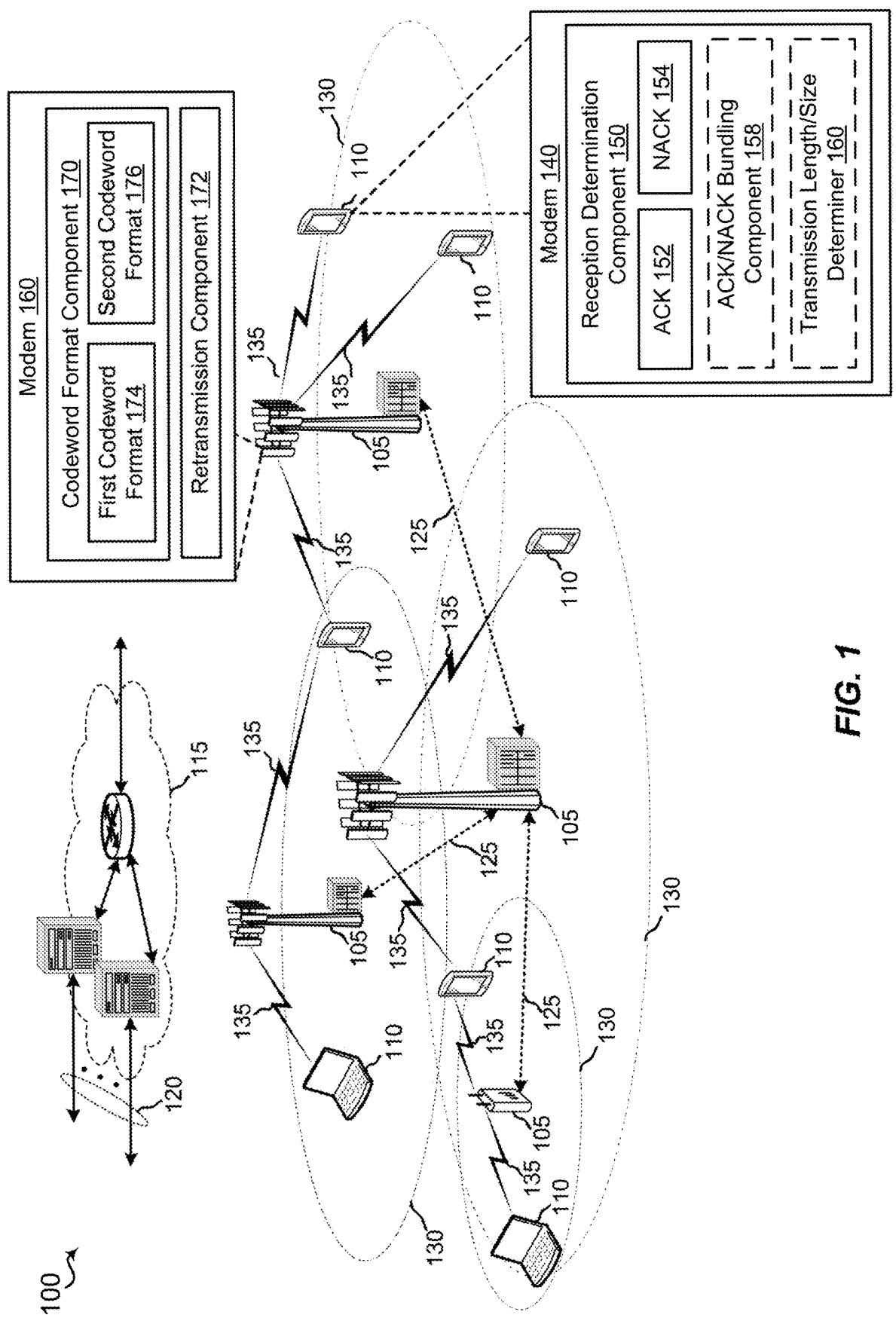
FIG. 1 is a schematic diagram of a wireless communication network including at least one base station having an codeword format component configured to transmit data according to a particular codeword format and at least one user equipment (UE) having a reception determination component configured to transmit an acknowledgement (ACK) or a negative ACK (NACK)

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to reducing control overhead in new radio wireless communication systems. Specifically, in low latency communication systems such as LTE ULL and/or LTE URLLC, a relatively short packet may be transmitted with a small latency. For example, in LTE URLLC, a 32 byte packet may be transmitted having a 1 millisecond (ms) end-to-end latency (e.g., between transmitter and receiver). In such communication systems, the control overhead may impact the latency such that an increase in the control overhead may correspondingly increase the latency and hence reduce communication efficiency/performance. As such, overhead reduction may be desirable in new radio wireless communication systems to reduce latency.

In some legacy communication system (e.g., LTE), with each subframe, up to two codewords (CW) per or for each transport block (TB) may be scheduled for transmission. That is, each codeword may be mapped to one TB. A codeword may be a distinct stream of data to be transmitted on a physical channel. In particular, downlink control information (DCI) may include or otherwise indicate one or more parameters relating to a modulation and coding scheme (MCS), a redundancy version (RV), and/or a new data indicator (NDI) in each of the two CWs. For instance, for each CW, a 5 bit MCS indication, a 2 bit RV indication, and a 1 bit NDI indication may be accommodated or included within the DCI. Accordingly, 16 bits may be utilized to transmit two CWs. Further, in the uplink, 2 bits may be utilized to transmit acknowledgment (ACK) or negative acknowledgement (NACK) for each CW over each configured component carrier (CC). Hence, applying the foregoing legacy transmission structure in low latency communication systems would not be desirable as the control overhead would remain quite high. Rather, it would be desirable to reduce the control overhead for both uplink and downlink communication in latency communication systems.

As such, the present aspects may provide control overhead reduction on both the downlink and the uplink. For example, in an aspect, a network entity may determine to transmit data according to a codeword format based on at least one of a transmission time interval (TTI), or a traffic type of the data, or any combination thereof. The network entity may further configure the data for transmission on a communication channel according to the codeword format and proceed to transmit the data on the communication channel. Additionally, in an aspect, a user equipment (UE) may receive a transmission from the network entity on a downlink communication channel according to the codeword format, and based on whether the data was received, may transmit at least one of an acknowledgement (ACK) or a negative acknowledgement (NACK) on an uplink communication channel. As such, the codeword format may indicate to the network entity and/or the UE an amount of overhead (e.g., MCS, RV, and/or NDI) to be included within or as part of each codeword and/or an acknowledgment structure on an uplink.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one UE 110 with a modem 140 having a reception determination component 150 that determines whether an acknowledgment (ACK) or a negative acknowledgment (NACK) may be transmitted in response to receiving data transmitted according to a codeword format on a downlink communication channel. Further, wireless communication network 100 may include at least one base station 105 with a modem 160 having a codeword format component 170 that determines to transmit data according to a codeword format (e.g., first codeword format 174 or a second codeword format 176) based on, for example, a transmission time interval (TTI) and/or traffic type of the data.

Thus, according to the present disclosure, to reduce overhead in LTE URLLC, the codeword format component 170 may limit a number of codewords to a single codeword according to the first codeword format 174. A codeword format may be a data structure having a given overhead. That is, a single set of TB related information including a single set of MCS, RV, and/or NDI information may be included as part of the DCI. As such, using the first codeword format 174, the control overhead may be reduced by 8 bits as a single set of MCS, RV, and/or NDI information is included as part of the codeword transmission. Further, codeword format component 170 may format and/or configure transmissions according to the second codeword format 176, which particularly reduce overhead in LTE ULL. For example, the second codeword format 176 may include one or two codewords. To reduce overhead using two codewords according to the second codeword format 176, however, codeword format component 170 may transmit a shared NDI with ACK/NACK bundling (e.g., resulting in 1 bit overhead reduction), a shared RV across both codewords (e.g., resulting in 2 bit overhead reduction), and the same MCS for both codewords (e.g., resulting in 5 bit overhead reduction). In some aspects, the shared RV may be shared across both codewords as a result or based on using the same NDI.

Modem 160 may also include retransmission component 172, which may be configured to retransmit data (e.g., codewords) in response to receiving at least one indication of a missing data from the UE 110. In some aspects, the retransmission component 172 may be configured to retransmit data in accordance with hybrid automatic repeat request (HARQ). For example, in legacy LTE, when 2 codewords are configured, their HARQ process identifier may be the same. In some aspects, due to this constraint (e.g., imposed for overhead reduction), in the event that one codeword fails, the retransmission opportunity may not be used to send the failed codeword with another codeword having a different HARQ process identifier. Rather, only the failed codeword may be retransmitted.

Nonetheless, given that downlink HARQ may be asynchronous (e.g., does not follow a specific timing pattern/schedule), the transmissions/retransmissions may be performed/completed faster via retransmission component 172. Specifically, retransmission component 172 may not only transmit/retransmit the failed codeword, but also either a new codeword or any other failed codeword having a different HARQ process identifier. Further, in some aspects, first codeword format 174 and/or second codeword format 176 may include one or more additional bits to indicate the HARQ process identifier per codeword. Such configuration may apply to LTE communication systems and/or ULL communication systems.

Additionally, wireless communication network 100 may further include UE 110, which may in turn include reception determination component 150 configured to transmit an ACK 152 or NACK 154 in response to receiving a transmission from base station 105. Specifically, in an example, UE 110 may receive a transmission from the base station 105 transmitted according to the first codeword format 174. Based on whether UE 110 received the data in its entirety (e.g., without missing packets or reception failure), UE 110 may transmit a 1 bit ACK or NACK on an uplink communication channel (e.g., per carrier).

Further, UE 110 may, via ACK/NACK bundling component 158, bundle ACK/NACKs across time, frequency, and/or spatial domains. Transmissions over time and spatial domains may be correlated and hence, the loss caused by bundling may not be significant. Bundling across time may be utilized when multiple downlink shortened physical downlink shared channels (sPDSCHs) map to the same (shortened) physical uplink control channel (s)PUCCH. Bundling over frequency (e.g., different component carriers) may degrade system performance as one or more channels may not be correlated over different carriers.

Accordingly, ACK/NAK bundling may be configurable via ACK/NACK bundling component 158. For example, in some aspects, with a two symbol sTTI length/size in the downlink and a two symbol sTTI length/size in the uplink, ACK/NAK bundling may be adopted. However, there may be instances where a two symbol sTTI length/size in the uplink coincides with a 1 ms uplink length/size. In some cases, the sTTI on the uplink may be dropped, and the uplink control information (UCI) may be sent over the longer uplink TTI length/size. As such, ACK/NAK bundling may not be utilized in such cases.

In some aspects, the configuration of the ACK/NAK bundling may be dependent on the sTTI length. For example, ACK/NACK bundling component 158 may bundle if a two symbol uplink transmission length/size is used, yet may not bundle when a single slot sTTI length/size is utilized. Accordingly, based on a determination via reception determination component 150 that if UE 110 fails to receive the codeword (corresponding to a failure of one of the TBs), a 1 bit NACK may be transmitted to the base station 105 as the base station 105 may transmit both codeword (or TBs) regardless. In some aspects, the aspects related to ACK/NACK bundling may apply to data received according to the first codeword format 174 and/or the second codeword format 176.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 120 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
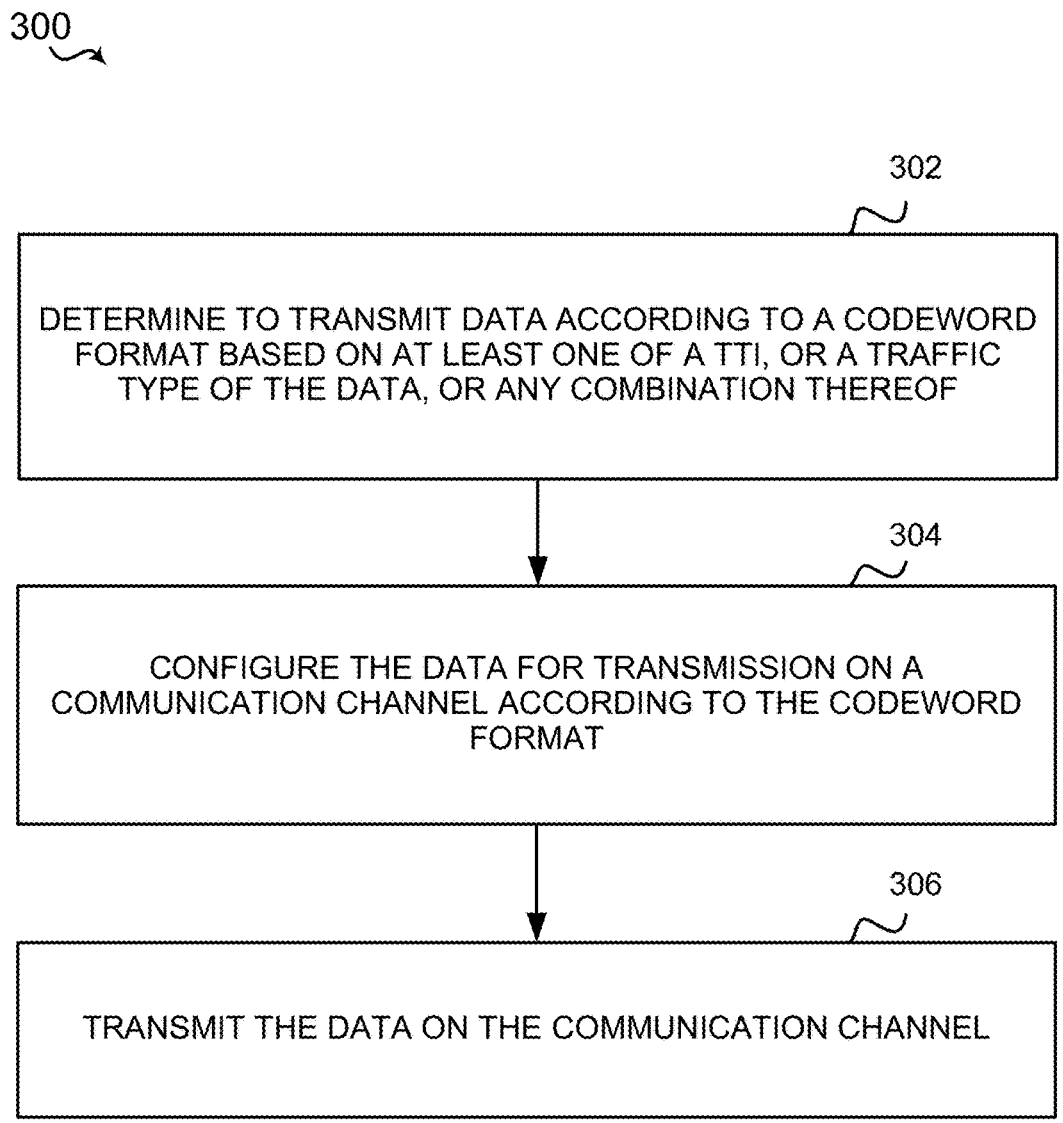
FIG. 2 is a flow diagram of an example of a method of wireless communication at a network entity.

Referring to FIG. 2, for example, a method 300 of wireless communication in operating a network entity such as base station 105 according to the above-described aspects to provide control overhead reduction a new radio environment includes one or more of the herein-defined actions. The blocks illustrated as having dashed lines may be optional.

At block 302, the method 300 may determine to transmit data according to a codeword format based on at least one of a TTI, or a traffic type of the data, or any combination thereof. For example, in an aspect, base station 105 may execute codeword format component 170 to determine to transmit data according to a codeword format (e.g., first codeword format 174 or a second codeword format 176) based on at least one of a TTI (e.g., TTI length), or a traffic type of the data, or any combination thereof In some aspects, the first codeword format 174 may include a single codeword having a single set of at least one of a MCS, a RV, or a NDI within DCI. Further, in some aspects, the traffic type may corresponds to URLLC (e.g., in the case of the first codeword format 174).

In some aspects, the second codeword format 176 may include two codewords having a single MCS, a single RV, and/or a single NDI shared across the two codewords. Further, the TTI may correspond to an sTTI. Additionally, the traffic type may correspond to LTE ULL communications (e.g., in the case of the first codeword format 176).

At block 304, the method 300 may configure the data for transmission on a communication channel according to the codeword format. For example, in an aspect, base station 105 may execute codeword format component 170 to configure the data for transmission on a communication channel according to the codeword format (e.g., first codeword format 174 or the second codeword format 176).

At block 306, the method 300 may transmit the data on the communication channel. For example, in an aspect, base station 105 may execute modem 160 to transmit the data on the communication channel.

Further, in some aspects, the transmitted data may be associated with at least one codeword. Although not shown, method 300 may receive, on an uplink communication channel, a NACK 154 indicating receipt failure of the at least one codeword, and transmit, according to codeword format (e.g., first codeword format 174 or the second codeword format 176), the at least one codeword and an additional codeword corresponding to a new codeword transmission or a failed codeword transmission having a distinct HARQ process identifier. In some aspects, the new HARQ identifier may be included in the DCI.

In some aspects, configuring the data for transmission on the communication channel according to the codeword format may include determining whether the codeword format corresponds to a single codeword associated with the sTTI or two codewords, bundling the data for transmission based on determining that the codeword format corresponds to the two codewords, and forgoing bundling of the data for transmission based on determining that the codeword format corresponds to the single codeword associated with the sTTI.

Figure 3:
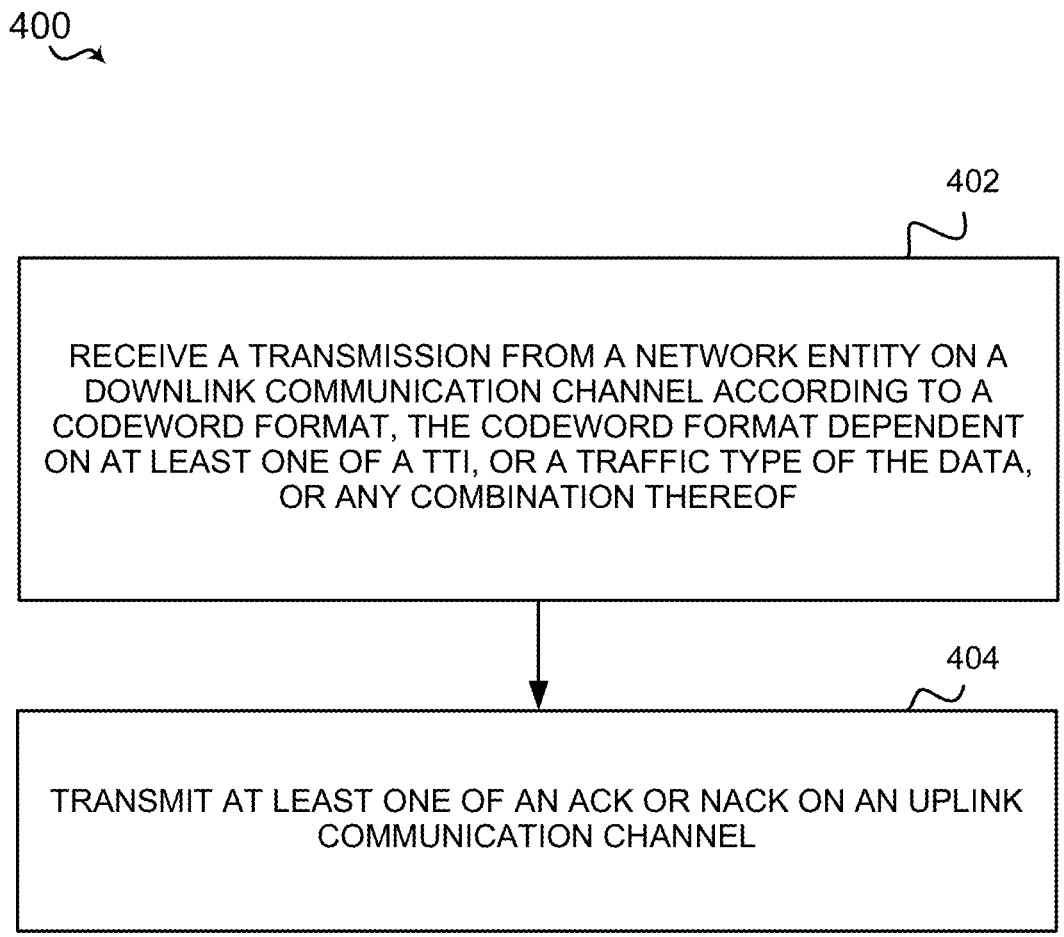
FIG. 3 is a flow diagram of an example of a method of wireless communication at a UE.

Referring to FIG. 3, for example, a method 400 of wireless communication in operating UE 110 according to the above-described aspects to transmit at least one ACK or NACK in response to receiving data according to a codeword format includes one or more of the herein-defined actions. The blocks illustrated as having dashed lines may be optional.

At block 402, the method 400 may receive a transmission from a network entity on a downlink communication channel according to a codeword format, the codeword format dependent on at least one of a TTI, or a traffic type of the data, or any combination thereof. For example, the UE 110 and/or modem 140 may execute reception determination component 150 to receive a transmission from a network entity (e.g., base station 105) on a downlink communication channel according to a codeword format (e.g., first codeword format 174 or a second codeword format 176), the codeword format dependent on at least one of a TTI, or a traffic type of the data, or any combination thereof.

At block 404, the method 400 may transmit at least one of an ACK or a NACK on an uplink communication channel in response to receiving the transmission from the network entity. For instance, the UE 110 and/or modem 140 may execute reception determination component 150 to transmit at least one of an ACK 152 or a NACK 154 on an uplink communication channel in response to receiving the transmission from the network entity.

In some aspects, the second codeword format may include two codewords. Although not shown, method 400 may, via ACK/NACK bundling component 158, detect a single NDI across the two codewords and determine, via ACK/NACK bundling component 158, reception failure of at least one TB associated with at least one of the codewords. Further, transmitting the at least one of the ACK 152 or the NACK 154 may include transmitting the NACK 154 based on determining reception failure of at least one transport block associated with at least one of the codewords.

In some aspects, although not shown, method 400 may determine, via transmission length/size determiner 160, whether a first TTI length or a second TTI length is to be used in transmitting on the uplink communication channel. In some aspects, transmitting the at least one of the ACK 152 or the NACK 154 may include transmitting the at least one of the ACK 152 or the NACK 154 according to ACK/NACK bundling based on a determination that the first TTI length is to be used in transmitting on the uplink communication channel, the first TTI length corresponding to two symbols, and foregoing transmission of the at least one of the ACK 152 or the NACK 154 according to ACK/NACK bundling based on a determination that the second TTI length is to be used in transmitting on the uplink communication channel, the second TTI length corresponding to a single slot sTTI. In some aspects, ACK/NACK bundling may be utilized when a 1 ms TTI/slot and a two symbol TTI/slot collide in the uplink.

Figure 4:
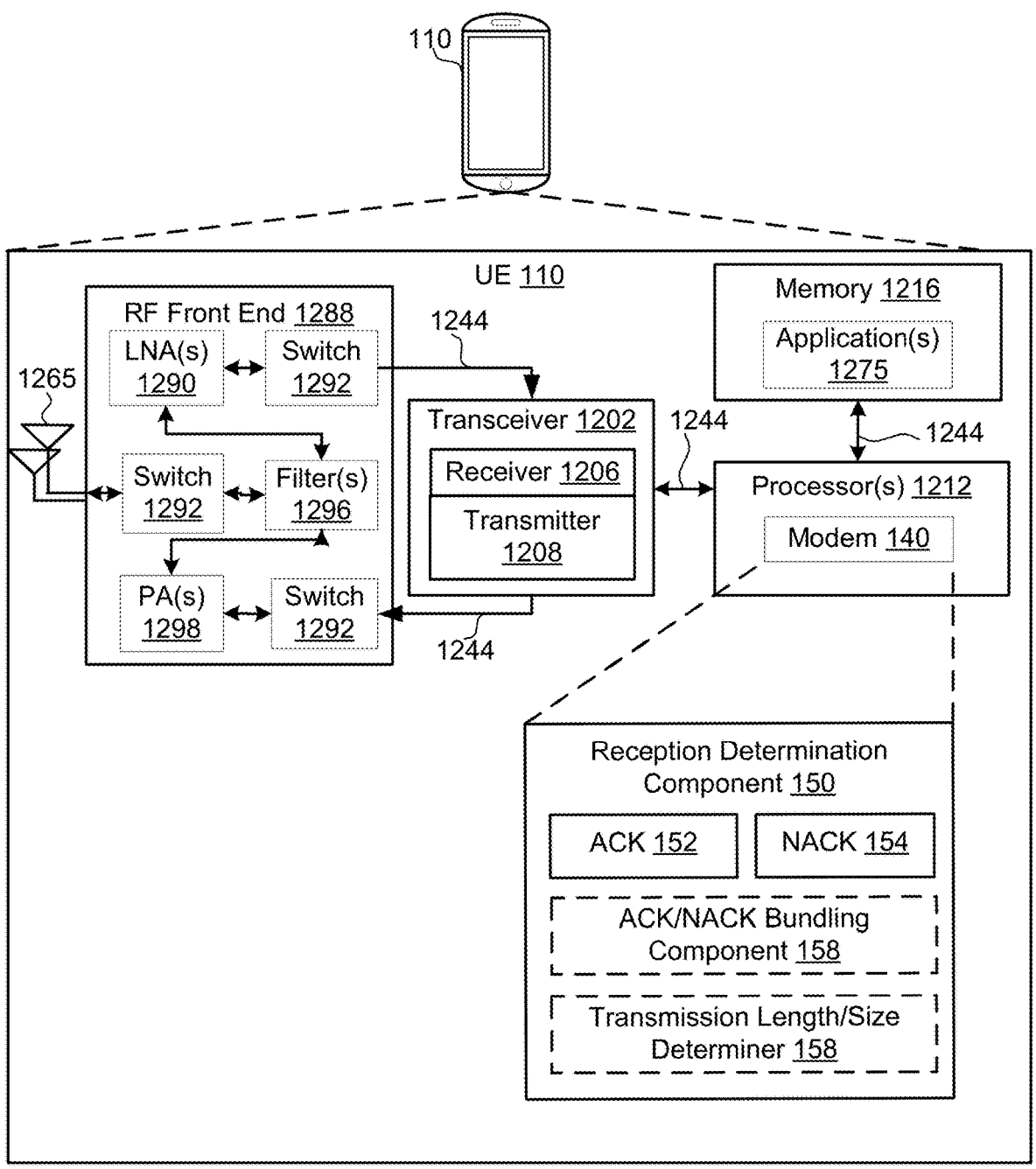
FIG. 4 is a schematic diagram of example components of the UE of FIG. 1.

Referring to FIG. 4, one example of an implementation of UE 110 may include a variety of components, some of which have already been described above, but including components such as one or more processors 412 and memory 416 and transceiver 402 in communication via one or more buses 444, which may operate in conjunction with modem 140 and reception determination component 150 to enable one or more of the functions described herein related to transmitting ACKs/NACKs based on a reception of data according to a codeword format. Further, the one or more processors 412, modem 414, memory 416, transceiver 402, radio frequency (RF) front end 488 and one or more antennas 465, may be configured to support voice and/or data calls (simultaneously or non-simultaneously) in one or more radio access technologies. In some aspects, the modem 414 may be the same as or similar to the modem 414.

In an aspect, the one or more processors 412 can include a modem 414 that uses one or more modem processors. The various functions related to resource identification component 150 may be included in modem 140 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 140 associated with resource identification component 150 may be performed by transceiver 402.

Also, memory 416 may be configured to store data used herein and/or local versions of applications 475 or resource identification component 150 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining resource identification component 150 and/or one or more of its subcomponents, and/or data associated therewith, when UE 110 is operating at least one processor 412 to execute resource identification component 150 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a RF receiver. In an aspect, receiver 406 may receive signals transmitted by at least one base station 125. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may include, but is not limited to, an RF transmitter.

Moreover, in an aspect, UE 110 may include RF front end 488, which may operate in communication with one or more antennas 465 and transceiver 402 for receiving and transmitting radio transmissions, for example, wireless communications transmitted by at least one base station 125 or wireless transmissions transmitted by UE 110. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and a corresponding specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 402 to operate at a specified frequency and power level based on the UE configuration of the UE 110 and the communication protocol used by modem 140.

In an aspect, modem 140 can be a multiband-multimode modem, which can process digital data and communicate with transceiver 402 such that the digital data is sent and received using transceiver 402. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 5:
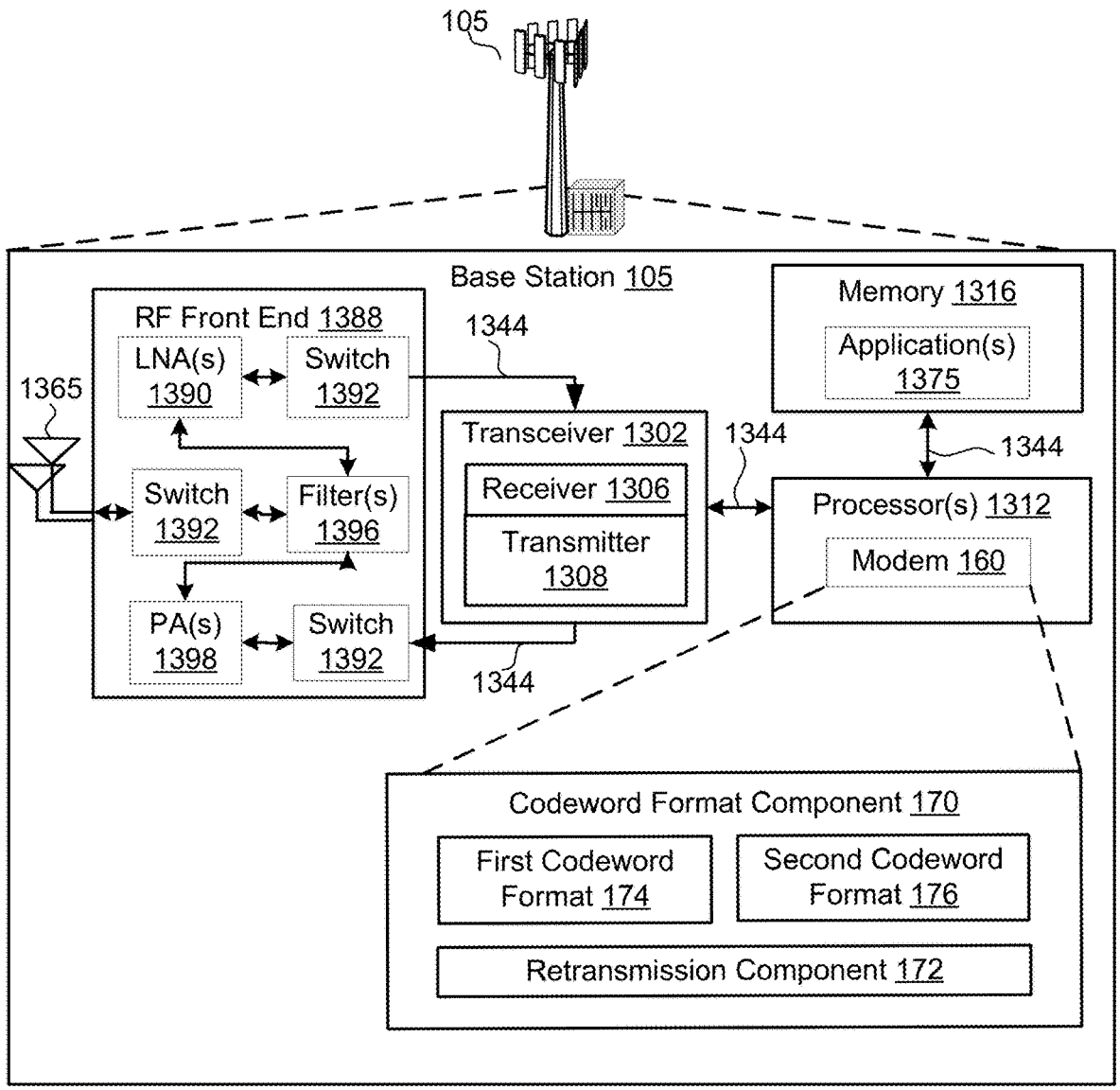
FIG. 5 is a schematic diagram of example components of the base station of FIG. 1.

Referring to FIG. 5, one example of an implementation of base station 105 may include a variety of components, some of which have already been described above, but including components such as one or more processors 512, a memory 516, and a transceiver 502 in communication via one or more buses 544, which may operate in conjunction with modem 160 and codeword format component 170 to enable one or more of the functions described herein relating to transmitting data according to determined codeword formats.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communications at a user equipment, comprising:
    means for receiving a transmission from a network entity on a downlink communication channel according to a codeword format corresponding to a single codeword for downlink communication, the codeword format dependent on at least a length of a transmission time interval (TTI); and
    means for transmitting at least one of an acknowledgement (ACK) or a negative acknowledgement (NACK) on an uplink communication channel in response to receiving the transmission from the network entity.

2. The apparatus of claim 1, further comprising:
    means for detecting a single new data indicator (NDI) associated with the single codeword; and
    means for determining reception failure of at least one transport block associated with at least one of a number of codewords,
    wherein the means for transmitting the at least one of the ACK or the NACK includes means for transmitting the NACK based on determining reception failure of at least one transport block associated with at least one of the number of codewords.

3. The apparatus of claim 1, further comprising means for determining whether a first TTI length or a second TTI length is to be used in transmitting on the uplink communication channel,
    wherein the means for transmitting the at least one of the ACK or the NACK includes:
        means for transmitting the at least one of the ACK or the NACK according to ACK/NACK bundling based on a determination that the first TTI length is to be used in transmitting on the uplink communication channel; and
        means for forgoing transmission of the at least one of the ACK or the NACK according to ACK/NACK bundling based on a determination that the second TTI length is to be used in transmitting on the uplink communication channel.

4. The apparatus of claim 1, wherein the single codeword includes a single set of at least one of a modulation and code scheme (MCS), a redundancy version (RV), or a new data indicator (NDI) within downlink control information (DCI).

5. A non-transitory computer-readable medium storing computer code executable by a processor for wireless communications at a network entity, comprising code for:
    determining to transmit data according to a codeword format corresponding to a single codeword for downlink communication based on at least a length of a transmission time interval (TTI);
    configuring the data for transmission on a downlink communication channel according to the codeword format; and
    transmitting the data on the downlink communication channel.

6. The non-transitory computer-readable medium of claim 5, wherein the single codeword includes a single set of at least one of a modulation and code scheme (MCS), a redundancy version (RV), or a new data indicator (NDI) within downlink control information (DCI).

7. The non-transitory computer-readable medium of claim 6, wherein the code for determining to transmit data according to the codeword format is further based on a traffic type, the traffic type corresponding to Ultra Reliable Low Latency Communication (URLLC).

8. The non-transitory computer-readable medium of claim 5, further comprising code for:
    receiving, on an uplink communication channel, a negative acknowledgement (NACK) indicating receipt failure of the single codeword; and
    transmitting, according to the codeword format, the single codeword and an additional codeword corresponding to a new codeword transmission or a failed codeword transmission having a distinct hybrid automatic repeat request (HARQ) process identifier.

9. The non-transitory computer-readable medium of claim 5, wherein the TTI corresponds to a shortened TTI (sTTI).

10. The non-transitory computer-readable medium of claim 9, wherein the code for configuring the data for transmission on the downlink communication channel according to the codeword format includes code for:
   determining that the codeword format corresponds to the single codeword associated with the sTTI; and
   forgoing bundling of the data for transmission based on determining that the codeword format corresponds to the single codeword associated with the sTTI.

11. The non-transitory computer-readable medium of claim 5, wherein the codeword format includes two codewords having a single MCS, a single RV, and/or a single NDI shared across the two codewords.

12. The non-transitory computer-readable medium of claim 7, wherein the traffic type corresponds to LTE Ultra Low Latency (ULL) communications.

13. The non-transitory computer-readable medium of claim 5, wherein determining to transmit data according to the codeword format includes determining to transmit data in a new radio wireless communication system according to the codeword format corresponding to the single codeword to reduce latency for short packet transmissions.

14. A non-transitory computer-readable medium storing computer code executable by a processor for wireless communications at a user equipment, comprising:
   code for receiving a transmission from a network entity on a downlink communication channel according to a codeword format corresponding to a single codeword for downlink communication, the codeword format dependent on at least a length of a transmission time interval (TTI); and
   code for transmitting at least one of an acknowledgement (ACK) or a negative acknowledgement (NACK) on an uplink communication channel in response to receiving the transmission from the network entity.

15. The non-transitory computer-readable medium of claim 14, further comprising code for:
   detecting a single new data indicator (NDI) associated with the single codeword; and
   determining reception failure of at least one transport block associated with at least one of a number of codewords,
   wherein transmitting the at least one of the ACK or the NACK includes transmitting the NACK based on determining reception failure of at least one transport block associated with at least one of the number of codewords.

16. The non-transitory computer-readable medium of claim 14, further comprising code for determining whether a first TTI length or a second TTI length is to be used in transmitting on the uplink communication channel,
   wherein the code for transmitting the at least one of the ACK or the NACK includes code for:
      transmitting the at least one of the ACK or the NACK according to ACK/NACK bundling based on a determination that the first TTI length is to be used in transmitting on the uplink communication channel; and
      foregoing transmission of the at least one of the ACK or the NACK according to ACK/NACK bundling based on a determination that the second TTI length is to be used in transmitting on the uplink communication channel.

17. The non-transitory computer-readable medium of claim 14, wherein the single codeword includes a single set of at least one of a modulation and code scheme (MCS), a redundancy version (RV), or a new data indicator (NDI) within downlink control information (DCI).

* * * * *